Figure 1:
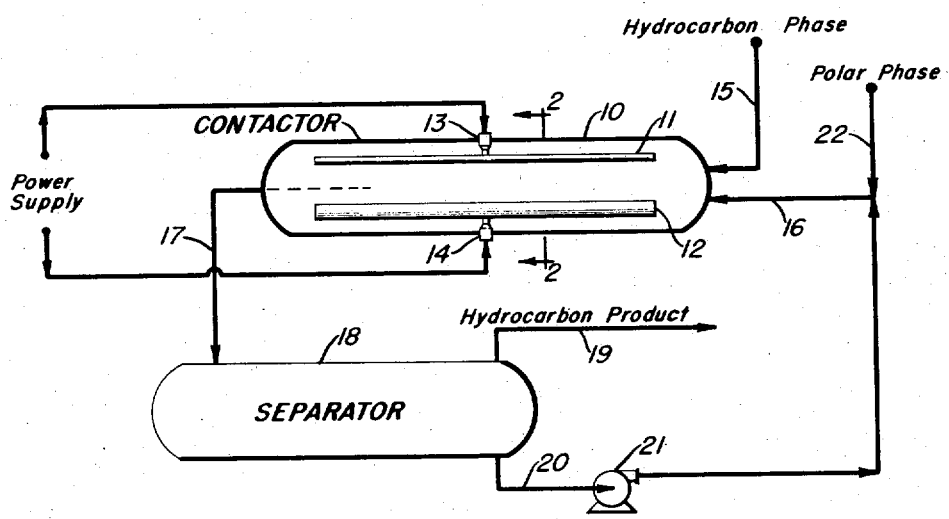

April 28, 1959     H. S. SEELIG ET AL     2,884,375
PROCESS FOR CONTACTING LIQUIDS Filed Aug. 2, 1954     2 Sheets-Sheet 1

INVENTORS:
Wendell P. Cropper
Herman S. Seelig
BY
Arthur G. Gilkes
ATTORNEY 2,884,375

PROCESS FOR CONTACTING LIQUIDS

Herman S. Seelig, Valparaiso, Ind., and Wendell P. Cropper, Lansing, Ill., assignors to Standard Oil Company, Chicago, Ill., a corporation of Indiana Application August 2, 1954, Serial No. 447,247

6 Claims. (Cl. 208—146)

Our invention relates to the mixing or intimate contacting of two non-aqueous liquid phases of differing dielectric properties.

It is well known that polar molecules, that is molecules having significant dipole moments, in liquid medium tend to orient themselves and migrate under the influence of an electrostatic fiield. When the electrical field is strong enough, polar charges can be induced and molecules bearing induced charges similarly orient and move in the field. This effect has been used to remove polar substances, both liquid and solid, from the liquid dispersions by coalescence or agglomeration and precipitation under the attractive forces set up by the field. We have discovered that by selective operation this process can be reversed and a remarkably intimate contacting and dispersion of separate liquid phases can be produced. When two dielectric liquids which differ in polarity, for example a hydrocarbon oil and a polar solvent, are placed in conjunction with one another in the form of separate, substantially continuous layers under the influence of a strong inhomogeneous electrostatic field, a surprising breakdown of the interface is almost instantaneously effected. As the influence of the electrostatic field is continued, a very fine dispersion is produced and extremely intimate contacting of the two phases results. The process proceeds first by seemingly molecular dispersion of the solvent from scattered points along the interface into the oil phase. Then as agitation increases, dispersion continues in the form of many turbulent streams of fine droplets until there is complete breakdown of continuous interface between the phases. The result is formation of a turbulent, substantially homogeneous mixture.

We have observed that the extent of mixing and the degree of dispersion obtained by action of the electrostatic field on liquid phases appear to be much greater and much more intimate than attainable by conventional mechanical mixing means. Thus, our discovery provides a process for effecting extremely intimate contact of liquids of different polarity where a particularly fine state of dispersion is desired, for example, in emulsification or in infusion of an oil with a flavoring, a perfuming or a coloring agent. We have found that the process when properly applied consumes very little power and in that respect can be more economical than conventional mechanical mixing means. The process has special value as a means for solvent extraction, particularly in the solvent refining of petroleum oils with selective solvents of the polar type. Moreover, the process is readily adaptable to effecting chemical reactions, particularly catalytic reactions of the homogeneous type, where effectiveness and/or selectivity of the reaction may depend upon the intimacy of contact obtained between the reaction materials. No moving mechanical elements are required in the zone of contact. Consequently, the process has special advantages in process systems where it is difficult to provide internal mechanical impellers driven by external power such as in high pressure processes and in systems where corrosive liquids, e.g. hydrogen fluoride, are employed.

Our invention comprises a process for intimately mixing non-aqueous liquid phases of differing polarity by bringing the liquids into contact, advantageously as two separate substantially continuous phases, within a dispersion zone defined by opposing electrodes and subjecting the phases to the influence of an inhomogeneous electrostatic field of sufficient strength imposed across the electrodes to form a fine dispersion of the phases: The strength of the electrostatic field is dependent upon the specific properties of the two liquids, particularly their relative viscosities, densities and relative polarities measured in terms of dipole moment. With lower absolute viscosity and viscosity difference and with lower interfacial tension, less field intensity is required. Also with increasing disparity in polarity, lower field intensity is required for dispersion. Electrode design and geometry and also the type of power source, that is, whether it is direct, interrupted direct or alternating, influences field intensity. Thus, the field intensity may vary rather widely from about 100 volts per centimeter in some cases to 25,000 volts per centimeter or more, limited by factors of power economy and the dielectric breakdown of the liquids exposed to the field. In general, a field intensity of about 6000 to 10,000 volts per centimeter is satisfactory. A short but finite time is required before substantial homogeneous turbulent mixing is accomplished. The liquid phases therefore are subjected to the influence of the inhomogeneous electrostatic field for a sufficient period of time for substantially homogeneous mixing to be obtained. Ordinarily, the time required is of the order of seconds rather than minutes although this is dependent upon factors of field intensity and the properties of the liquids involved.

The process may be applied batch-wise, but it is applied with particular advantage in the form of a continuous contacting process in which the liquid phases are continuously charged to a contacting vessel in which a dispersion zone defined by the electrodes establishing the electrostatic field is provided. The dispersed mixture is continuously withdrawn from the dispersion zone although, if desired, a separation zone integral with the dispersion zone may be provided so that the separated phases may be withdrawn separately from the contacting zone. For processes such as extractive solvent refining, a series of contacting zones may be provided with appropriate intermediate settling zones for separation. Thus, concurrent or countercurrent flow may be provided as is conventional in solvent refining processes together with the usual facilities for recovery of solvent by gravitational separation and stripping for recycle to the process. The procedural variations in the practice of the invention will be more apparent from the description to follow of the drawings.

Figure 1 of the accompanying drawings is a simplified schematic flow diagram of an electrostatic contacting system according to the invention.

Figure 2:
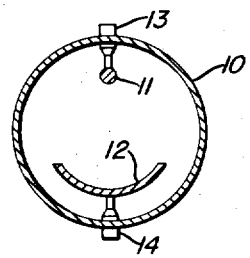

Figure 2 of the drawings is a sectional view across the contactor of Figure 1.

Figure 3:
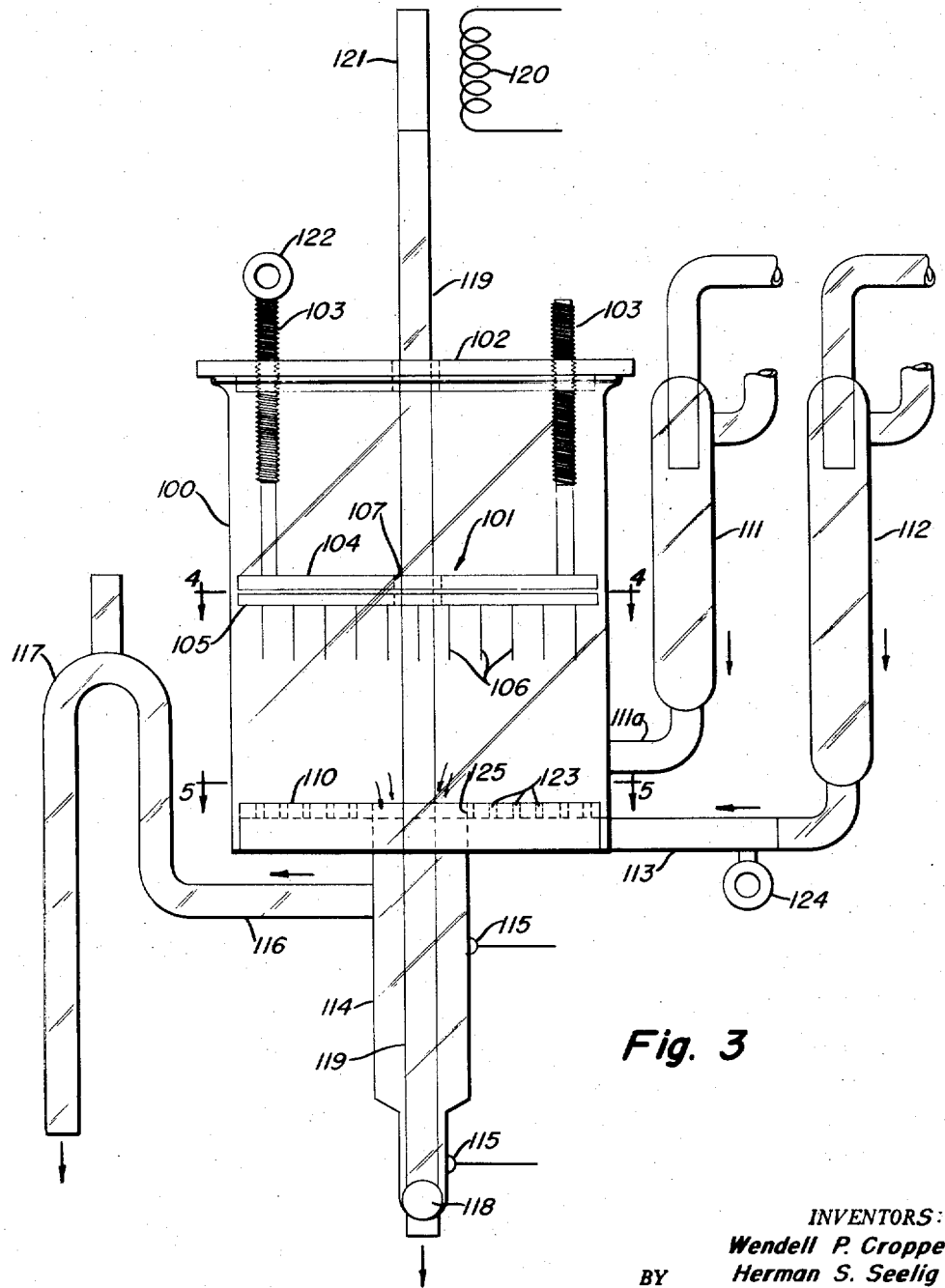

Figure 3 of the drawings is a schematic diagram of a small scale continuous contacting device equipped with an integral separator.

Figures 4, 5:
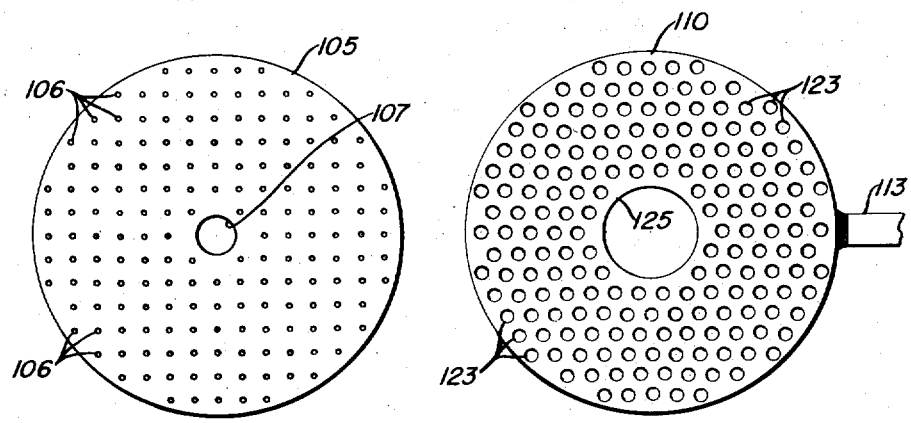

Figure 4 of the drawings is a bottom plan view of the upper electrode illustrated in Figure 3.

Figure 5 of the drawings is a bottom plan view of the lower electrode of Figure 3.

In the apparatus of Figure 1, the contacting zone is indicated as an elongated horizontally disposed tubular vessel 10. The contactor 10 is equipped with a pair of electrodes 11 and 12 which are shaped so as to provide an inhomogeneous electrostatic field between them. As may be better seen in Figure 2, upper electrode 11 is in the form of a rod while lower electrode 12 is in the form of a curved surface. The desired electrostatic field is created between the electrodes by a difference in electromotive force applied by means of appropriate high voltage generation equipment (not shown), which is connected in conventional manner with electrodes 11 and 12 via high voltage terminals 13 and 14 attached to the shell of contactor 10 and suitably insulated from it.

In the operation of the invention, the hydrocarbon oil phase may be charged to an upper portion of contactor 10 by means of line 15. A relatively polar liquid phase, which may function as a solvent phase or as a reactant phase, then is charged to a lower portion of contactor 10 by means of line 16. The dispersed phases are withdrawn from contactor 10 at the end opposite charge lines 15 and 16 from a region within the dispersion zone defined between electrodes 11 and 12, for example, the region corresponding to the normal interface of the two phases. The mixture is passed by line 17 to a baffled settler or other separating means 18. In Figure 1, it is assumed that the contacting process is an operation essential to a process in which the oil phase is subjected to treatment by the polar phase, as in solvent extraction or reaction, the phases are separated by gravitational settling following the period of contact treatment, and the separated oil product is removed from settler 18 by line 19 to a product recovery system. The separated polar phase may be recirculated to the process directly as by line 20, pump 21 and line 16, or it may be subjected to extract separation or by-product clean-up in the usual manner as by distillation prior to recirculation. Fresh solvent or make-up may be added to the system through line 22. Figure 1 shows a highly simplified system, and in particular operations, the system shown would be desirably one element of a series of contacting and settling zones in which the flow of oil and polar phases could be generally concurrent or countercurrent as process considerations indicate. When the contacting system is used to form a stable homogeneous mixture of the phase as in emulsification or infusion operations, vessel 18 functions as a product collector rather than as a separator although a series of contacting stages without discharge to intermediate product collectors can be employed.

In an example of a mixing process employing equipment of the type shown schematically in Figure 1, a solution of 10% ortho- and 10% para-xylenes in iso-octane was employed as a non-polar oil phase. Dimethylformamide was employed as a dipolar liquid. A pool of mercury was used as the bottom electrode in a contact chamber having a diameter of approximately 5 centimeters. The top electrode was a rod 1 centimeter in diameter. A D.C. source of power was employed and the electrodes were connected in a manner making the bottom electrode positive. First, the efficiency of mixing of the two phases by diffusion in the absence of an electric field was determined by introducing 20 cc. of dimethyl formamide into the bottom of the vessel. Then 30 cc. of the xylene solution was added carefully on top of the dimethyl formamide. The efficiency of mixing, as a function of the amount of xylenes dissolved in the solvent, was followed by determination of the refractive index of the raffinate. The refractive index of the xylenes feed was 1.4130. The refractive index after 150 minutes contact time in the first experiment was 1.4111. In the second experiment, a low potential, namely 640 volts, was applied across the electrodes. Very slight evidence of mixing was apparent, and the refractive index of the raffinate after 150 minutes of 1.4101 indicated that more xylenes had been removed from the hydrocarbon solution than in the no-field experiment. The power consumption was about 0.3 watt at a current flow of 0.0005 milliampere. In the third experiment, an E.M.F. of 10,000 volts was applied across the electrodes. A turbulent, violent mixing resulted, and the period of contact time was reduced from 150 minutes to 1 minute. The refractive index of the raffinate was 1.4049. The power in-put was 14 watts, at a current flow of 1.4 milli-amperes. To determine the completeness of mixing in the third experiment, the same volumes of materials were carefully contacted in a separatory funnel. A comparison of the resulting refractive index of the raffinate, 1.404, with that in the electrostatic material demonstrated that essentially complete mixing had been achieved by the electrostatic means in 1 minute or less. In both of the field experiments the electrode was 2 cm.

In the apparatus schematically shown in Figure 3, the mixing vessel 100 contains a pair of oppositely disposed electrodes 101 and 110 located respectively in upper and lower portions of the vessel. A sight glass 111 is attached by means of connection 111a to the side of vessel 100 for charging the non-polar liquid phase into the dispersion zone of contact vessel 100 defined between electrodes 101 and 110. A second sight glass 112 is attached to contact vessel 100 through side arm 113 of lower electrode 110 for charging the relatively polar liquid to the contact vessel. A settling zone in the form of a pendant tubular section 114 is provided below contact vessel 100. A pair of electrical contacts 115 are sealed into the glass wall of settling section 114. Slightly above and opposite the upper electrical contact 115 is side arm 116 through which the upper liquid phase separating in settling section 114 may be withdrawn by means of automatic siphon 117. At the tip of the settling section 114 is a ground glass joint formed by grinding the end 118 of glass rod 119 into the inner wall of settling section 114 so as to provide a liquid tight seal against the static head of liquid in the settling and mixing zones. The lower liquid phase separating in settling section 114 is withdrawn through the ground glass joint when the rod 119 is automatically disengaged by action of solenoid coil 120 on soft iron armature 121 attached to the upper end of glass rod 119.

The details of upper electrode 101 may be best seen in conjunction with the bottom plan view of the electrode shown in Figure 4. The upper electrode 101 is supported by a Bakelite plate 102 and a plurality of threaded rods 103. The electrode is of double brass-plate construction in which the supporting threaded rods 103 are attached to upper plate 104. Lower plate 105 is a common support for a plurality of needle shaped conductors 106 arranged in parallel and terminating in a common plane parallel to the surface of lower plate 105. In one example of a useful electrode, there were 160 individual conductors 106 supported by lower electrode plate 105. Each conductor 106 was located at the corner of a square ¼" on a side. At the center of electrode 101 is a circular opening 107 to permit reciprocation of rod 119. Upper electrode 101 is connected to a source of high voltage power at terminal 122.

The lower electrode 110, as may be seen best in Figure 5, is a shallow cylinder the upper base of which is perforated by ⅛" holes 123. The center of each hole, in the example, is at the apex of an equilateral triangle ³⁄₁₆" on a side. Charge liquid from sight glass 112 is charged to electrode 110 through side arm 113. The lower electrode 110 may be sealed to the bottom of contact vessel 100 with a suitable cement, e.g. Saureisen cement. The electrode 110 is connected to a high voltage source at terminal 124. Lower electrode 110 is provided with a centrally located annulus 125 through which rod 119 passes. Annulus 125 is large enough to provide free communication between the dispersion and settling zones.

To illustrate operation of the cell shown in Figure 3, dimethylformamide as solvent was pumped through sight glass 112 into the space bounded by the inner walls of lower electrode 110 until solvent flowed through holes 123 in the upper surface of the electrode. A layer of solvent about 2 mm. thick over the surface of lower electrode 110 was obtained before solvent started to spill into settling section 114 through opening 125. The pumping of solvent was continued until the solvent level in settling section 114 reached upper electrical contact 115. At this point, pumping of solvent was momentarily interrupted and pumping of charge oil, isooctane containing about 1 mg./100 cc. of an oil soluble blue dye, was started. The oil was pumped through sight glass 111 into contact vessel 100 until the oil level in the dispersion zone reached the height governed by the position of the automatic siphon. The oil level was adjusted so that the tips of the conductors 106 of upper electrode 101 extended about 2 mm. below the surface of the oil. Solvent pumping was now resumed and the apparatus was allowed to reach equilibrium with both pumps operating. At equilibrium solvent and oil are withdrawn from the settling section 114 automatically and the solvent-oil interface in the settling section is maintained at the position of the upper electrical contact 115 since the electrical properties of the solvent are such that contacts 115 are short-circuited by the relatively conductive solvent thus activating a relay (not shown) which energizes solenoid coil 120. The action of coil 120 on armature 121 effectively disengages ground glass joint 118 located at the tip of settling section 114. As the oil-solvent interface falls below the position of the upper contact 115, the circuit through the contacts is interrupted and rod 119 drops, thus shutting off the flow of solvent from the settling section.

After uniform flow of solvent and oil through the cell was obtained, an electrostatic field was applied across electrodes 101 and 110. The voltage was 6200 at an electrode separation of 1.8 centimeters, and the current flow was 30 microamperes. The power input was 0.17 horsepower per barrel. The efficiency of the mixing process was measured by observing the extraction of the dye from the oil by the solvent, leaving a colorless oil layer. The optical density of the extract and raffinate fractions was determined with an electrophotometer.

In a test run over a period of 46 minutes, solvent was pumped at the rate of 550 ml./hour and oil was pumped at 585 ml./hour. About 125 ml. of each of the effluent streams were collected before the electric field was applied. Essentially constant transmission values for the effluent streams had been observed after equilibrium flow through the cell had been established, but with the intimate contacting provided by application of the electric field, pronounced drop in the optical transmission of the extract and improvement in the optical transmission of the raffinate resulted. The first extract fractions collected after application of the voltage contained relatively large amounts of dye. The optical transmission of both the extract and raffinate actions increased until the transmission data showed no further change at about 350 ml. effluent. This point corresponds to equilibrium distribution of the dye between the phases and thus provided evidence of complete contacting during the mixing process. Additional runs indicated that 5 to 10 times as much material could be processed through the apparatus at the same expenditure of power.

In the example, extraction of an oil soluble dye from a hydrocarbon fraction using dimethylformamide as solvent was illustrated. The invention, however, may be adapted to a variety of solvent extraction and solvent refining processes. For example, aromatic rich hydrocarbon fractions such as catalytic and thermal cycle oils, reformates and extract oils can be contacted with selective solvents such as phenol, nitrobenzene, furfural, liquid sulfur dioxide, dimethylformamide and other dipolar solvents for production of pure aromatics and aromatic concentrates. Also various petroleum stocks can be upgraded by contacting with extractive solvents. For example, distillate fuels may be treated for removal of sulfur containing compounds. Similarly, lubricating oil fractions may be refined by solvent extraction, and diesel fuels and cracking charge stocks may be upgraded by removal of heavy aromatic type materials.

In the practice of the invention in solvent extraction operations, a number of advantages result. Contact time can be readily controlled and often may be reduced because of the highly efficient turbulent mixing obtained. Ordinarily, about 30 seconds to 1–5 minutes is adequate. The contacting may be conducted in a single vessel or in a series of interconnected vessels equipped for intermediate separation of solvent and extract phases. The charge liquids may be premixed mechanically in feed lines or tanks by means of conventional orifice mixers or mixing pumps. Dependent on the nature of the operation and the solvent employed, either or both phases are treated in the usual manner for recovery of solvent for recycle and for separation of product and extract fractions. Separation by settling may be effected in settling legs or zones integral with the vessel housing the dispersion zone, but it is essential to obtain the extremely fine contacting of the invention rather than coalescence that the electrodes bound the dispersion zone and that withdrawal from it is of the mixed phases. Any interface forming by separation of phases must be entirely outside the zone defined by the electrodes which must not be operatively situated in a layer formed by one or the other of the separating phases.

In analogous manner, the invention is applicable to the reaction of hydrocarbons, particularly catalytic reactions employing liquid phase catalyst systems. For example, isomerization of paraffins and alkylation of aromatics may be conducted with aluminum chloride liquid complexes and sludges. Other liquid dipolar catalyst systems such as liquid hydrogen fluoride, hydrogen fluoride-boron trifluoride mixtures, chlorsulfonic acid and the like may be employed for effecting hydrocarbon reactions. The catalyst, if normally a solid such as aluminum chloride, should be employed in sufficiently diluted solution or slurry so that efficiency of mixing will not be handicapped by high viscosity. Viscous liquids and sludges are technically feasible, but increased power demands and extended contacting time often make the handling of liquids of materially different viscosities impracticable.

The efficiency and/or selectivity of reaction is promoted by means of the invention because of the extremely fine dispersion of the polar catalyst phase in the hydrocarbon reactant phase and the resulting highly turbulent, substantially homogeneous mixture. The period of reaction time can be closely controlled, and the reaction can be applied in a high pressure system since no moving parts have to be introduced into the reaction zone. The operation may be conducted batchwise or by continuously or intermittently pumping the hydrocarbon reactant through a mixing and reaction zone containing a body of the liquid phase catalyst. Reaction products are recovered in a separate recovery system. Catalyst can be continuously recycled, with make-up as required, by providing a settling or separating zone in association with the reactor. Additional flexibility may be introduced into reaction processes by constructing one or both of the electrodes of material which can influence the nature of the reaction or which can enter into the reaction. For example, a screen type electrode constructed of copper may be used to form copper chloride in situ by contact with chlorine as a step in sweetening of sour oils by a modified copper chloride technique. The invention also has potential application to separation and transfer processes such as diffusion where dispersion of material along or breakdown of a liquid interface is desired.

In experimental studies in connection with our invention, we have observed that in a D.C. field the more dipolar liquid of two superimposed liquids is actually drawn up and circulated through the less polar, e.g., the hydrocarbon phase. There is a tendency as dispersion increases for the dipolar liquid to form streamers or columns of liquid. Since the dipolar liquid is more conductive than the hydrocarbon phase, there is a significant increase in power consumption as these columns form. When a pulsating field, however, is employed, the streamers or columns of liquid do not have a chance to form. Each time the field is removed, incipient and partially formed columns collapse. This promotes agitation so that a violent mixing develops within the zone of contact and a better dispersion is the result. At the same time, power consumption is reduced. For example, experiments have been conducted with a pulsating field over a frequency range of 0.1 to 2.0 pulsation per second, i.e., creation and collapse of the field once in every 2–10 seconds. Power consumption compared to that with a D.C. field was reduced several fold. In these experiments, an interrupted D.C. field was provided by use of a modified Chevrolet distributor, but an A.C. source of power, over a broader frequency range, can also be employed.

We have tested a variety of polar solvents for degree of mixing with a hydrocarbon phase. In illustrative experiments, a small glass electrostatic mixing cell, 5" high by 8" long, was employed. The bottom electrode was a pool of mercury, and the upper electrode consisted of a plate bearing 234 2.5" by 0.057" needles. The power supply comprised a high voltage transformer system capable of delivering 25,000 volts at 0.0001 ampere. The hydrocarbon phase was isooctane and the separation between the upper electrode and the solvent level was 1.0 centimeter. In general, very fine dispersion was achieved with all solvents having a significant difference in polarity, in terms of dipole moment, from that of the hydrocarbon phase. The mixing with dioxane, however, appeared to be poor, probably because of its very low dipole moment. On the other hand, mixing of water with the hydrocarbon phase also was unsatisfactory, and serious arcing through the hydrocarbon phase developed, probably because of the high conductivity of the aqueous medium. The data are summarized in the following table.

TABLE I

*Summary of mixing experiments*

Hydrocarbon layer: Isooctane.
Separation between upper electrode and solvent: 1.0 cm.

| Solvent | Dipole Moment | Voltage (kilovolts) | Type of Mixing |
|---|---|---|---|
| Nitrobenzene | 3.9 | 7.0 | Excellent. |
| Furfural | 3.6 | 3.7 | Good. |
| Nitromethane | 3.1 | 2.8 | Do. |
| Pyridine [1] | 2.1 | 5.6 | Excellent. |
| Ethyl Acetate [1] | 1.8 | 9.0 | Do. |
| Isopropanol [1] | 1.8 | 8.0 | Do. |
| Water | 1.7 | 9.0 | Poor.[2] |
| Aniline | 1.6 | 5.0 | Excellent. |
| Dimethylformamide | | 6.0 | Good. |
| Methanol [1] | 1.6 | 2.0 | Do. |
| Ethylene Glycol | 1.5 | 5.2 | Fair. |
| Acetic Acid [1] | 0.8 | 9.0 | Good. |
| Dioxane [1] | 0.4 | 12.0 | Poor. |

[1] Solvent and hydrocarbon are miscible; a homogeneous solution was produced.
[2] Because of arcing.

The effect of voltage variation on degree of mixing, with the system aniline and n-hexadecane and with a separation of 2.5 centimeters between the electrodes, is indicated by the following experimental results:

TABLE II

*Power consumption in electrostatic mixing*

Aniline, 100 ml.
n-Hexadecane, 300 ml.
Separation between upper electrode and solvent, 2.5 cms.

| Voltage | Current, ma. | H.P./bbl. | Type of Mixing |
|---|---|---|---|
| 7,500 | 0.02 | 0.08 | Mild. |
| 9,800 | 0.05 | 0.27 | Average. |
| 10,000 | 0.5 | 2.7 | Violent. |

Experimental work with a circulating cell containing a 3¾" mercury pool as one electrode and a brush type electrode with 164 pointed conductors spaced ¼" apart was performed on a two-phase system of dimethylformamide and isooctane. Voltages ranging from about 4–12 kilovolts were employed. It was found that the efficiency of contacting decreases as the power input increased. The efficiency of contacting was highest when continuous jet streams between the electrodes were not permitted to form. Electrode separations of less than 2 centimeters appear to be unsatisfactory in this respect. Good mixing was obtained at power outputs ranging from 0.1 to 0.5 horsepower per barrel of material. This compares very favorably with mechanical power requirements of about 1 horsepower per barrel at comparably high levels of mixing.

Although wide variety in the design and geometrical arrangement of electrode elements can be employed in the practice of the invention, it is essential to provide an electrode configuration which provides a strongly inhomogeneous electrostatic field. We believe that dispersion of molecules from the polar phase into the non-polar phase is promoted when the force applied to the liquid system is non-uniform. For this purpose, a brush type electrode is advantageous. For example, the use of a metal plate of about 1½" in diameter was equipped with 50 rods spaced about ⅛" apart. The rods were 1/16" in diameter and were pointed at the end. In an experimental test of this electrode and a mercury electrode, violent and turbulent mixing of dimethylformamide and isooctane resulted at a potential difference of 4000 volts, and an electrode spacing of 1½".

In an alternative arrangement, the brush type electrode can be mounted rotatably so that it can be rotated about its vertical axis by means of appropriate motor driving elements.

Another type of useful electrode comprises a number of short concentric cylinders, the bases of which terminate in a plane just beneath and parallel to the surface of the non-polar oil phase. By way of example, the interannular spacing between concentric rings may be about 0.1" to 2" and the thickness of the rings may be about 0.005" to 0.25". For the thicker rings, say 0.25", it is desirable to provide a knife edge on the side facing the area type electrode. To further vary the field effect, the concentric cylindrical section may be serrated, slotted, notched or escalloped. Instead of employing cylindrical electrode sections, other shapes such as rectangular and other angular shapes may be employed. A screen type electrode may be advantageously used in conjunction with an imposing flat type electrode to produce an inhomogeneous field. The electrostatic effect of special electrode shapes can be further modified by mounting the electrode in suitable connection with mechanical or electrical drive means so that the electrode elements can be rotated at a desired rate.

The cell also may take various forms. Usually, it is advantageous to employ rather shallow rectangular cells since it is desirable to restrict electrode spacings to the order of 0.1 to 10 inches, preferably about 6 to 8 inches. Tubular cells, however, may be used, and to handle large volumes of liquids, it is desirable to use a plurality of tubes connected in parallel.

We claim:

1. A process for intimately contacting non-aqueous liquid phases of different polarity including a hydrocarbon oil and a second dielectric liquid of polar character relative to the hydrocarbon which comprises bringing the liquid phases into contact within a dispersion zone defined by opposing electrodes, forming a fine dispersion of droplets of the second dielectric liquid in the hydrocarbon phase by subjecting the phases to the influence of an inhomogeneous electrostatic field of sufficient strength imposed across the electrodes to form a fine dispersion of the liquid phases, maintaining one electrode in contact with the continuous liquid phase of the second dielectric liquid, maintaining a region corresponding to the normal interface of the non-aqueous liquid phases within the inhomogeneous electrostatic field and maintaining the phases under the influence of the electrostatic field for sufficient time to effect turbulent substantially homogeneous mixing of said phases.

2. A process for intimately contacting non-aqueous liquid phases of different polarity including a hydrocarbon oil and a second dielectric liquid of polar character relative to the hydrocarbon, which comprises continuously bringing the liquid phases into contact within a dispersion zone defined by opposing electrodes, forming a fine dispersion of droplets of the second dielectric liquid in the hydrocarbon phase by subjecting the phases to the influence of an inhomogeneous electrostatic field of sufficient strength imposed across the electrodes to form a fine dispersion of the phases, maintaining one electrode in contact with the continuous liquid phase of the second dielectric liquid, maintaining an opposing electrode in a position out of direct contact with the continuous liquid phase of the second dielectric liquid, mantaning a region corresponding to the normal interface of the non-aqueous liquid phases within the inhomogeneous electrostatic field, maintaining the phases under the influence of the electrostatic field for sufficient time to effect turbulent substantially homogeneous mixing of said phases and continuously withdrawing a stream of said mixed phases from the dispersion zone.

3. The process of claim 1 in which the field is defined by a pulsating power source.

4. The process of claim 1 in which the phases are brought into contact within the dispersion zone as two separate substantially continuous liquid phases.

5. A process for solvent refining of liquid petroleum fractions which comprises bringing the petroleum fraction into contact with a relatively polar non-aqueous solvent within a dispersion zone defined by opposing electrodes, forming a fine dispersion of droplets of the relatively polar non-aqueous solvent in the petroleum fraction by subjecting the phases to the influence of an inhomogeneous electrostatic field of sufficient strength imposed across the electrodes to disperse the relatively polar solvent in the form of finely divided droplets in the petroleum fraction, maintaining one electrode in contact with the continuous liquid phase of the relatively polar non-aqueous solvent, maintaining a region corresponding to the normal interface between the petroleum fraction and the relatively polar non-aqueous solvent within the inhomogeneous electrostaic field, maintaining the phases under the influence of the electrostatic field for sufficient time to effect turbulent substantially homogeneous mixing of said phases, withdrawing a stream of said mixed phases from the dispersion zone, separating the mixture into a raffinate phase and an extract phase, recovering solvent from the extract phase and recycling solvent to the system.

6. A process for conducting mixed phase, non-aqueous catalytic reactions which comprises bringing a liquid reactant and a relatively polar liquid catalytic phase into contact within a dispersion-reaction zone defined by opposing electrodes, forming a fine dispersion of droplets of the relatively polar liquid catalytic phase in the liquid reactant by subjecting the phases to the influence of an inhomogeneous electrostatic field of sufficient strength imposed across the electrodes to form a fine dispersion of the phases, maintaining one electrode in contact with the continuous relatively polar liquid catalytic phase, maintaining a region corresponding to the normal interface between the liquid reactant and the relatively polar liquid catalytic phase within the inhomogeneous electrostatic field, maintaining the phases under the influence of the electrostatic field for sufficient time to effect turbulent substantially homogenous mixing of said phases and adequate reaction time, withdrawing said phases from the dispersion-reaction zone and recovering a reaction product.

References Cited in the file of this patent
UNITED STATES PATENTS

| 1,801,784 | Schwarz | Apr. 21, 1931 |
| 2,577,247 | Irwin | Dec. 4, 1951 |
| 2,605,377 | Kaehni et al. | July 29, 1952 |
| 2,614,064 | Carney | Oct. 14, 1952 |
| 2,658,169 | Barrett | Nov. 2, 1953 |